(12) United States Patent
Hauck et al.

(10) Patent No.: US 7,788,833 B2
(45) Date of Patent: Sep. 7, 2010

(54) ANIMATED LIGHT SOURCE AND METHOD

(75) Inventors: Lane T. Hauck, 5346 Bragg St., San Diego, CA (US) 92122; Kevin T. Hauck, 102 Hoskins Ct., #808, Stanford, CA (US) 94305

(73) Assignees: Lane T. Hauck, San Diego, CA (US); Kevin T. Hauck, Standford, CA (US)

( * ) Notice: Subject to any disclaimer, the term of this patent is extended or adjusted under 35 U.S.C. 154(b) by 279 days.

(21) Appl. No.: 11/673,545

(22) Filed: Feb. 9, 2007

(65) Prior Publication Data
US 2007/0183152 A1 Aug. 9, 2007

Related U.S. Application Data

(60) Provisional application No. 60/771,931, filed on Feb. 9, 2006.

(51) Int. Cl.
*G09F 13/00* (2006.01)
(52) U.S. Cl. ............... 40/442; 40/544; 362/249.05; 362/249.13; 362/295; 315/185 S; 315/312
(58) Field of Classification Search .............. 40/442
See application file for complete search history.

(56) References Cited

U.S. PATENT DOCUMENTS

| 4,274,130 A | * | 6/1981 | Elliott | 362/184 |
|---|---|---|---|---|
| 4,291,979 A | * | 9/1981 | Yuasa et al. | 356/218 |
| 4,677,533 A | * | 6/1987 | McDermott et al. | 362/240 |
| 4,963,798 A | * | 10/1990 | McDermott | 315/312 |
| 5,752,766 A | * | 5/1998 | Bailey et al. | 362/249.04 |
| 6,016,038 A | * | 1/2000 | Mueller et al. | 315/291 |
| 6,166,496 A | * | 12/2000 | Lys et al. | 315/316 |
| 6,380,865 B1 | * | 4/2002 | Pederson | 340/815.45 |
| 6,388,390 B2 | * | 5/2002 | Rachwal | 315/200 R |
| 6,600,270 B2 | * | 7/2003 | Belliveau | 315/200 A |
| 6,623,151 B2 | * | 9/2003 | Pederson | 362/542 |
| 6,657,393 B2 | * | 12/2003 | Natsume | 315/82 |
| 6,692,138 B2 | * | 2/2004 | Chornenky | 362/252 |
| 7,204,606 B2 | * | 4/2007 | Brass et al. | 362/231 |
| 7,410,269 B2 | * | 8/2008 | Harrity et al. | 362/101 |
| 2005/0122710 A1 | * | 6/2005 | Kim | 362/157 |

\* cited by examiner

*Primary Examiner*—Joanne Silbermann
*Assistant Examiner*—Kristina Staley
(74) *Attorney, Agent, or Firm*—Bernard L. Kleinke; Duckor Spradling Metzger & Wynne

(57) ABSTRACT

An animated light source and method are provided. The light source may include a plurality of solid-state emitters and a control circuit for controlling the selective energization of the emitters individually to from a beam of light along an axis. The emitters may be selectively energized to provide the appearance of motion of light within the beam.

23 Claims, 10 Drawing Sheets

US 7,788,833 B2

ANIMATED LIGHT SOURCE AND METHOD

RELATED APPLICATION

This application claims priority to U.S. provisional patent application, entitled ANIMATED LIGHT SOURCE AND METHOD, Application No. 60/771,931, filed Feb. 9, 2006.

FIELD OF THE INVENTION

The present invention relates in general to an animated light source and method, and it more particularly relates to a light source including a group or cluster of individual lights such as solid-state emitters.

BACKGROUND ART

This section describes the background of the disclosed embodiments of the present invention. There is no intention, either express or implied, that the background art discussed in this section legally constitutes prior art.

Light sources are typically used to illuminate or to attract attention. For example, a flashlight provides illumination and traffic signals and automobile tail lights are designed to be easily visible. These displays are typically switched completely on or off. It would be desirable to make these and other light sources more visible by presenting a dynamic, changing display rather than a fully-on display. The increase in visibility for a tail-light or traffic signal provides two benefits—it is more attention-getting and therefore safer, and a dynamic changing display can reduce power since all display elements are not illuminated at the same time. A flashlight can be made safer for anyone walking at night using a flashlight, because while providing illumination for the user, it also provides a moving, and therefore more visible display, for oncoming traffic.

Light sources that present changing patterns are known, for example U.S. Pat. No. 6,206,537 to Hauck periodically changes the color of a moving light source to give the effect of colored light bars in the air. Also, flashlights built from solid-state emitters, such as light emitting diodes (LEDs), are popular due to the availability of efficient and very bright white LEDs. Some of these flashlights have different switchable intensity settings, where different overall intensities are accomplished by simultaneously powering varying numbers of LEDs.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

Figure 1:
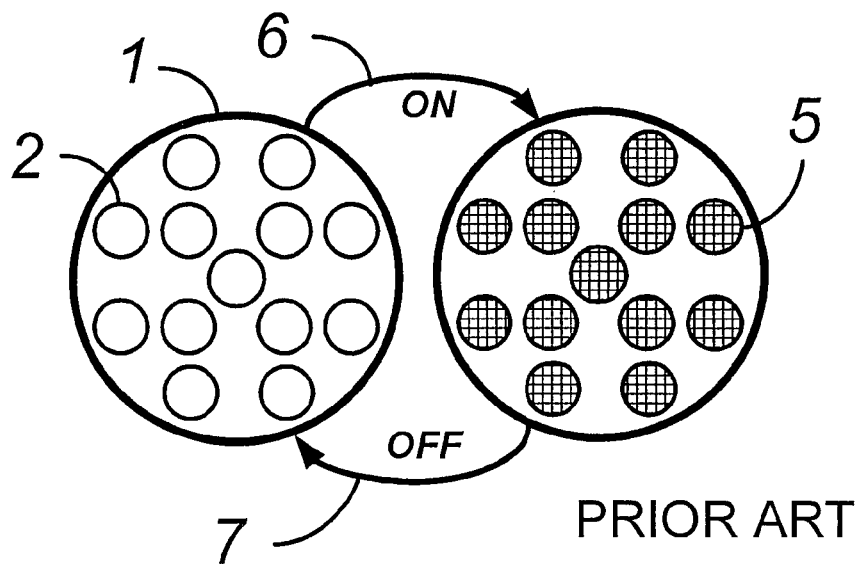
FIG. 1 is a diagrammatic view of two states of an array of lights that form a conventional light source, for example a flashlight, built from a plurality of solid state emitters (LEDs), which is switched on and off like any flashlight as constructed according to the prior art.

APPENDIX A is a program listing for one example implementation of the Animated light source.

APPENDIX B shows the correspondence between L-variables in the APPENDIX A listing and LED positions.

DETAILED DESCRIPTION OF CERTAIN EMBODIMENTS OF THE INVENTION

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiment of the invention.

Prior art examples of LED flashlights do not provide the ability to present different animated patterns of small light sources, which in aggregation form the light beam. For example, it would be desirable to have a flashlight project a beam such that its appearance differs depending on the viewpoint of the observer. To the flashlight holder, it appears as an illumination source similar to any flashlight for shining a beam to illuminate a surface, but to an observer facing the flashlight or to the side of the flashlight, the beam appears as a moving pattern of small discrete light sources. The motion makes the light source more visible and attention-getting to the observer, and therefore safer than a conventional flashlight with a static light source.

According to an embodiment of the invention, there is provided a light source which may include a plurality of solid-state emitters and a control circuit for controlling the selective energization of the emitters individually to from a beam of light along an axis. The emitters may be selectively energized to provide the appearance of motion of light within the beam.

According to other embodiments of the invention, there is provided a signal light source assembly for attachment to a light source apparatus such as a traffic signal light or a vehicle having at least one signal light such as a tail light or brake light. The signal light source can be a component of the original equipment of the apparatus, or can be used to retrofit existing convention illumination components.

It may also be advantageous to project a light beam containing a certain amount of visible motion in the beam. Such a beam could illuminate a stair-step, and the animated beam would serve the double purposes of illuminating the potential hazard, and also attracting attention to the area due to the animated motion in the beam.

Turning to FIG. 1 there is shown a diagrammatic view of two states of the front of a conventional flashlight or other light source constructed with a plurality of discrete light emitting diodes (LEDs) and generally referenced as 1. Light assembly 1 may comprise an array of LEDs, for example LED 2. With such a conventional light source, the user may activate a power switch, and the array makes a transition 6 to illuminate all of the LEDs. For purposes of explanation, LED 5 is shown with a crosshatched pattern depicting that the LED is in its fully illuminated state (FIG. 14).

Figure 14:
FIG. 14 is a diagram in the form of a legend to aid understanding of the figures of the drawings, showing examples of four different patterns to indicate various brightness levels of an LED element.

It should be noted that FIG. 14 shows a legend relating crosshatch patterns for a few of various different LED intensities. The legend displays representations for an LED that is off, an LED that is on, and LEDs at two intermediate intensities, dim and medium.

Figure 2:
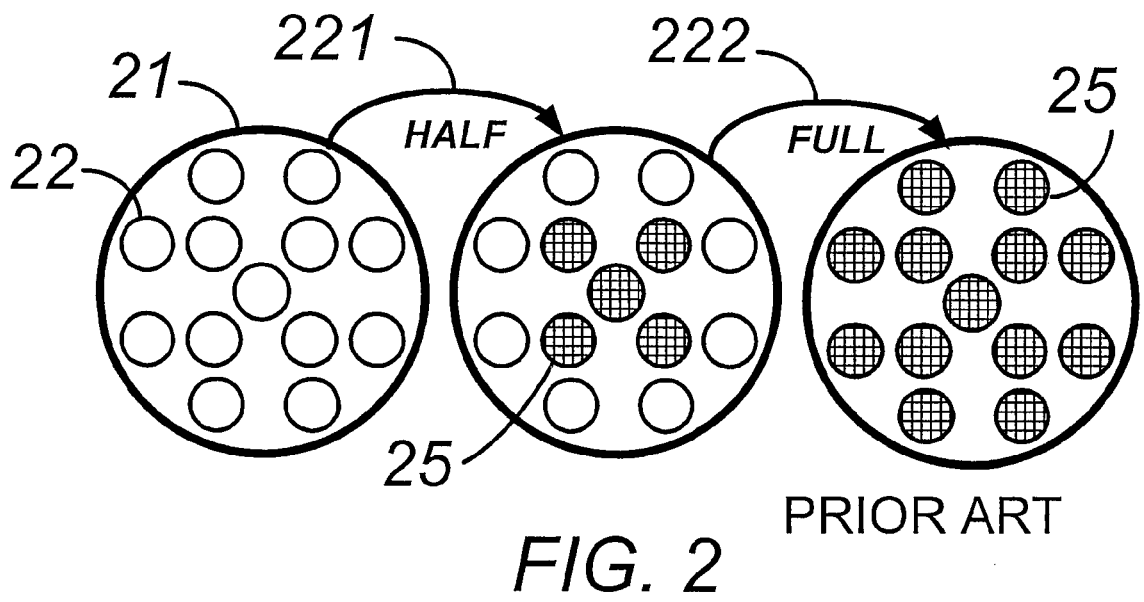
FIG. 2 is a diagrammatic view of three states of an array of lights that form a conventional vice which turns on selected grouping of the LED light sources to provide different flashlight beam intensities as constructed according to the prior art.

FIG. 2 is a diagrammatic view of three states of another example of a conventional light source, in which the LEDs can be turned on in various combinations to achieve different beam intensities. The user may turn on the unit by activating a switch, and transition 221 turning the middle LEDs to the ON state 25 while leaving the outer LEDs in the OFF state 22. Activating the switch again causes transition 222, turning on all of the LEDs to the ON state 25 and creating a brighter beam.

Figure 3:
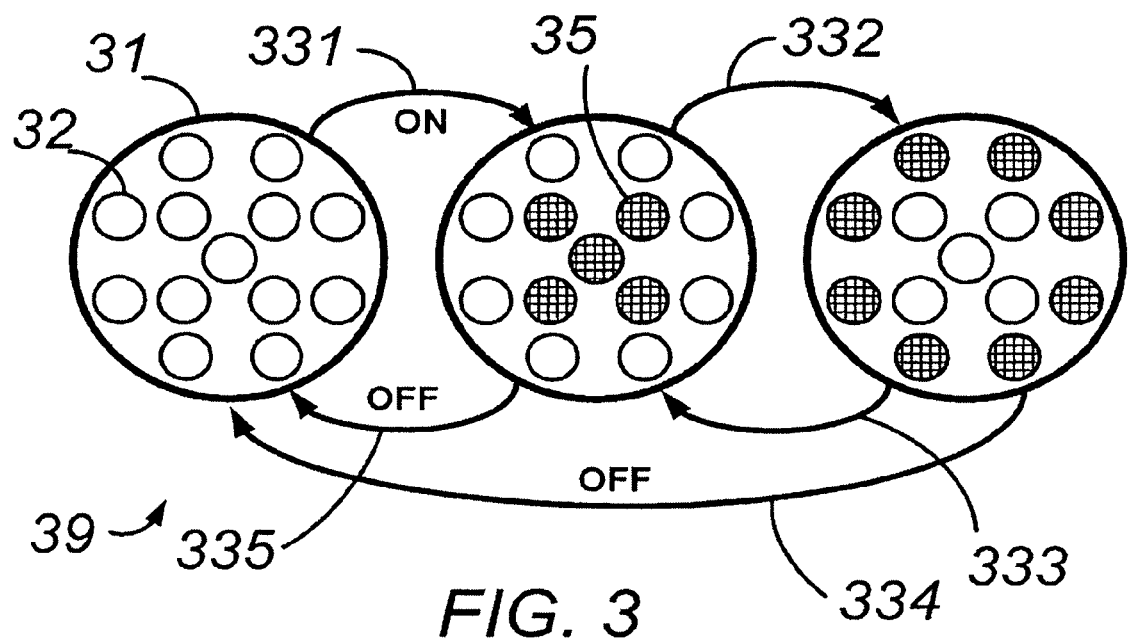
FIG. 3 is a diagrammatic view of three states of an array of lights according to an embodiment of the invention, wherein after the light source turned on, the light source may automatically sequence between two different LED patterns to give a motion effect to the display.

FIG. 3 shows a diagrammatic view of three states of the front or light emitting portion of an animated light source constructed with a plurality of discrete LEDs according to an embodiment of the present invention and generally referenced as 39. The light emitting portion may include an array of LEDs, such as LEDs 32 and 35, symmetrically arranged about a center point of the light emitting portion. As before, the user may activate a switch to turn on the light source 39 by making a transition 331 turning a first set of LEDs to the ON state 35 while leaving a second set of LEDs in the OFF state 32. At this moment the display may appear the same as in FIG. 2 after transition 221. However after a fixed time interval, for example one-half second, the display may automatically make a transition 332, in which the first set of LEDs (the five center ones) may be extinguished to the OFF state 32 and a second set of LEDs (the eight LEDs around the periphery of the LED grouping) may be illuminated to the ON state 35. After a second time interval (for example one-half second) the unit may automatically make transition 333, turning off the second set of LEDs and turning back on the first set of LEDs. The device may continue to alternate between these states, thereby providing an animated and attention-getting display, while simultaneously functioning as a light source such as a flashlight.

It should be understood that the method described herein may not be limited to only two animated states, since any number of animated states may be possible. Also, the groupings of LEDs corresponding to each step or pattern in the animation may be any combination of the LEDs. At any time, the user may switch the unit off, and transition 334 or 335 may return the light source 39 to its OFF state.

Figure 4:
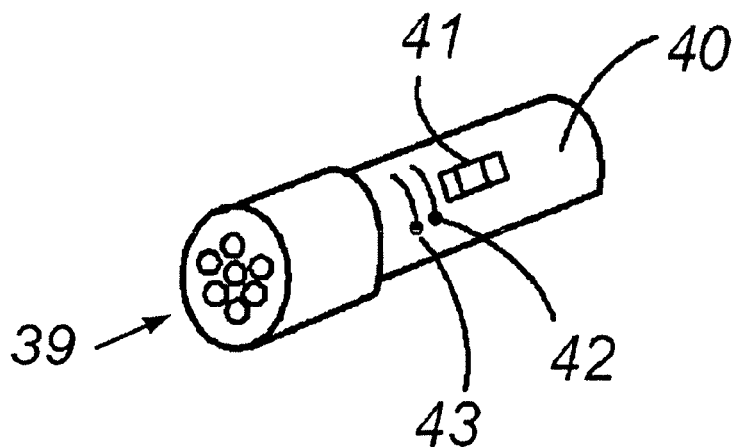
FIG. 4 is a pictorial view of an embodiment of the animated light source housed in a flashlight housing.

FIG. 4 shows a flashlight utilizing the animated light source 39 and generally referenced as 40. The flashlight 40 may be controlled by a three-way slide switch 41. When switch 41 is moved to the first position 42, power may be applied to the animated light source 39 and it may begin cycling through a fixed animation pattern, for example the one shown in FIG. 3. When the switch 41 is momentarily moved to position 43, the animated light source 9 may begin to project a second animation sequence, different from the one shown in FIG. 3. Every time the user moves the momentary switch from position 42 to 43, the animation sequence may change, until it reaches the maximum number of stored sequences at which time it may return to the initial sequence and repeat. It is important to note that there may be a very large variety of animations possible, due to the fact that the particular grouping of LEDs in a pattern, and the number of patterns in an animation sequence may be arbitrary.

Figure 5:
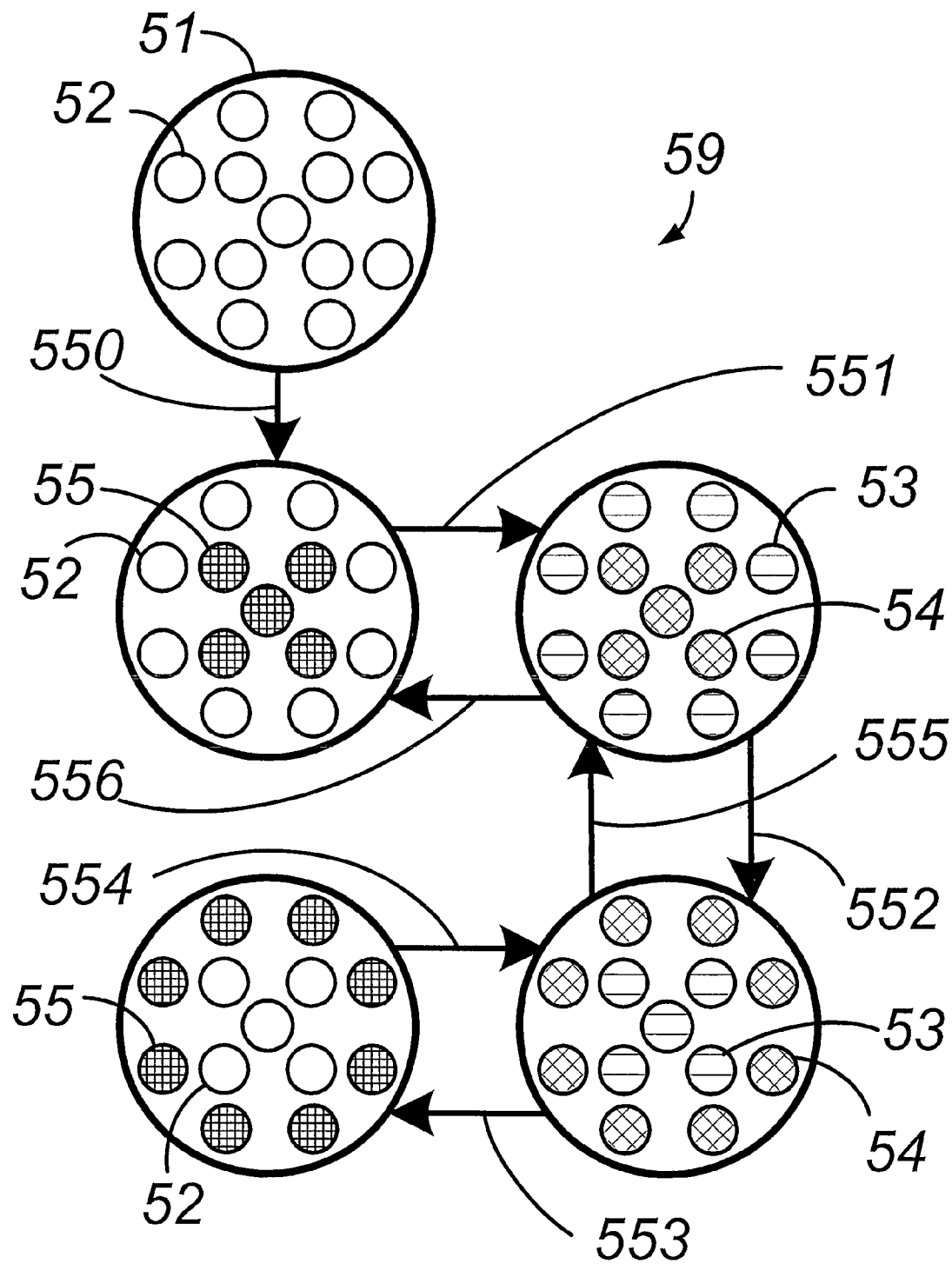
FIG. 5 is a diagrammatic view of five states of an array of lights according to an embodiment of the invention, where the animated light patterns may be smoothly ramped in intensity from one to the next, instead of abruptly switching between the animating patterns as in FIG. 3.

FIG. 5 shows a diagrammatic view of five states of another embodiment of an animated light source, generally referenced as 59, adding a pleasing visual effect. Instead of abruptly switching between full-on and full-off LED patterns to display one animation step, it may smoothly ramp down the intensity of the old group of LEDs, as it may smoothly ramp up the intensity of the new group of LEDs. For the purpose of explanation, FIG. 5 illustrates two patterns of LEDs, an inner circle of five LEDs, and an outer circle of eight LEDs. Although the following discussion describes a smooth transition between these two LED patterns, it also could apply to the transition of any first pattern of LEDs into any second pattern of LEDs.

The user may switch on the unit, making transition 550. In this state, the center LED pattern may be illuminated at full intensity 55. Then transitions may occur automatically and periodically in the repeating sequence:

551-552-553-554-555-556-551-552-553-554-555-556-551-552 . . . .

Considering first the transition 551, it is seen that the pattern comprising the center circle of LEDs may decrease in intensity from full brightness 55 to medium brightness 54, while the pattern comprising the outer circle of LEDs may increase in intensity from off 52 to dim 53. At transition 552, the center circle pattern may further decrease in intensity from medium brightness 54 to dim 53, while the outer circle pattern may further increase in intensity from dim 53 to medium brightness 54. At transition 553, the center circle pattern may further decrease in intensity from dim 53 to off 52, while the outer circle pattern may further increase in intensity from medium brightness 54 to full brightness 55. The sequence may then reverse by automatically making transitions 554, 555, and 556. Then the entire cycle may be repeated.

To help clarify explanation of this animating effect, the table shown below depicts the changes in intensity for the two LED circle groups.

| Inner Circle | Outer Circle |
|---|---|
| On | Off |
| Medium | Dim |
| Dim | Medium |
| Off | On |
| Dim | Medium |
| Medium | Dim |
| On | Off |
| Medium | Dim |
| Dim | Medium |
| etc. | etc. |

As the inner circle pattern of LEDs diminishes in intensity, the outer circle pattern of LEDs may increase in intensity, and vice versa. This may produce a gradual replacement of one LED pattern with the other. The increases and decreases in intensity may be linked by a reciprocal relationship (the amount of intensity increase in one group may equal the amount of intensity decrease of the other group) or the increase-decrease rates may be independent.

The time delays between transitions 551-556 may be independent and arbitrary, and may be tailored to the specific design. For example it may be desired to pause the pattern changes after transitions 553 and 556, so that the two groups of LEDs may be fully on and off for a longer period of time than during the transitory "ramping" LED states after transitions 551, 552, 554, and 555. Furthermore, FIG. 5 simplifies the mechanism by showing only two intermediate states between the full brightness states. In practice a larger number of transitional states interposed between the full brightness states may give the appearance of a linearly increasing LED brightness rather than presenting observable discrete changes in LED intensity.

Figure 6:
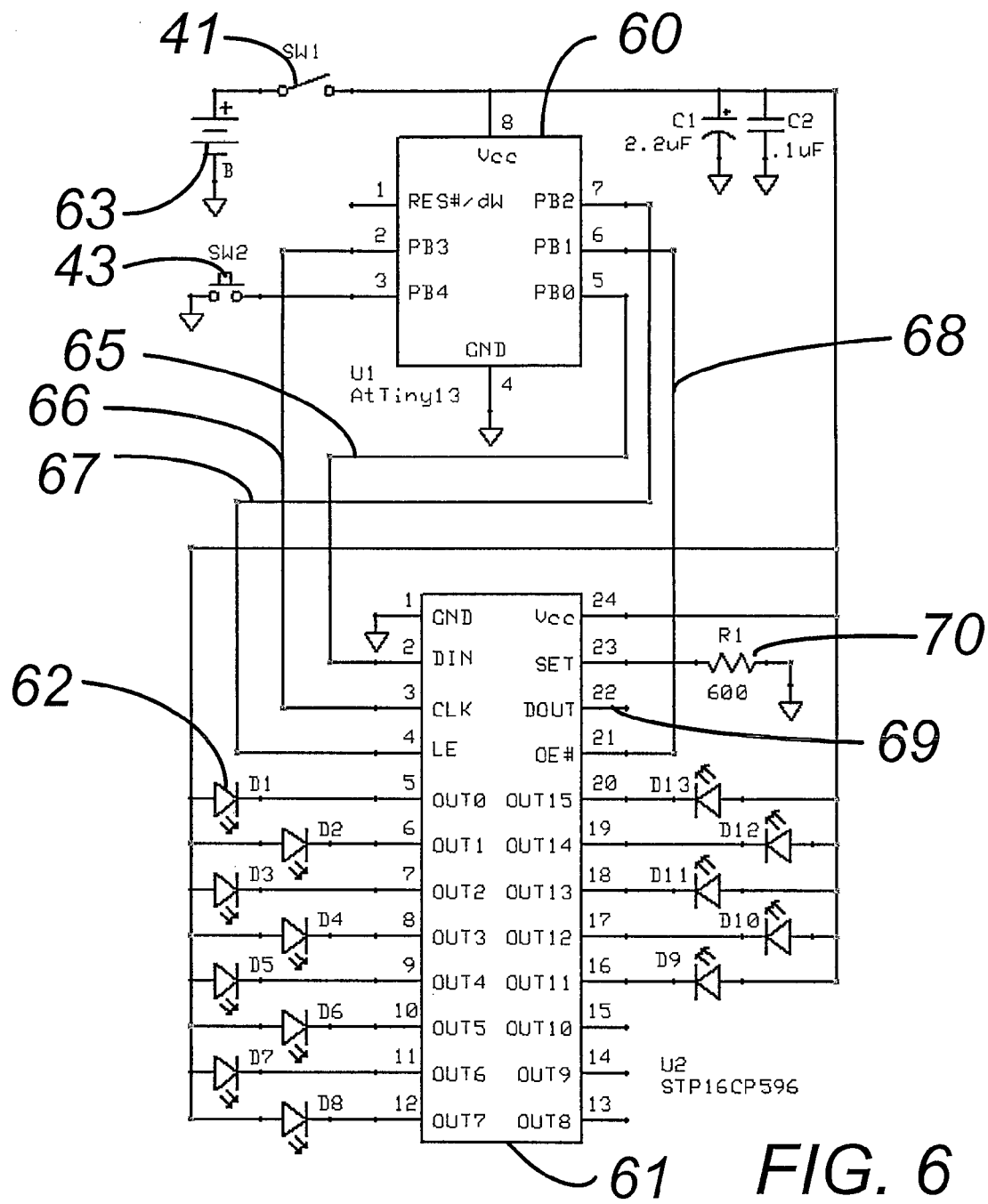
FIG. 6 is a schematic diagram of a microcontroller-based circuit to achieve the effect depicted in FIG. 3, as well as many other pattern sequences.

Turning now to FIG. 6, there is shown a schematic diagram for an electronic circuit capable of producing the pattern changing effect shown in the animated light source 39 of FIG. 3. Once this circuit is understood, it will be seen that a relatively small addition to the circuit may accomplish the gradual dimming transitional effect just described.

Integrated Circuit 61 may be designed to drive an array of LED light sources. Outputs OUT0 through OUT16 may be sixteen constant-current sinks each of which may be designed to provide a constant current drive signal to an LED such as LED 62. Constant current drive may provide three advantages in driving LED loads. First, it may eliminate the need for individual current-limiting resistors for each LED which would be required for a constant voltage driver. Second, it may help match the brightness characteristics of the individual LEDs because the current sources may be matched in integrated circuit 61. Third, the LED brightness may be relatively independent of the voltage supplied by battery 63, an important consideration in a flashlight application where the battery voltage may slowly decrease over time.

Integrated circuit 61 may be part number STP16CP596 from ST Electronics. Integrated circuit 61 may contain a 16-bit shift register with data input DIN 65 and clock input CLK 66. To clock data into this shift register, a data signal may be applied to the DIN 65 and a low-to-high transition is applied to CLK 66. The clock signal 66 may then be returned low, and another data bit may be applied to 65. This sequence may occur 16 times to clock in the 16 bit data. Then the Latch Enable signal LE 67 may be pulsed high then low to latch the 16 shift register values into an internal latch. This may cause all 16 outputs OUT0-OUT16 to change at the same time to reflect the 16 new values that were clocked into the internal shift register. The 16 latch outputs may drive the output current sinks that drive the output pins OUT0 through OUT16.

Signal 68, OUTPUT ENABLE, may allow the controlling circuit 60 to enable (turn on) or disable (turn off) all sixteen current sinks simultaneously. The connection 68 may be used to control the intensity of all LEDs that are switched on. If a pulse-width-modulated square wave is supplied on signal 68, whose frequency may be above the limit at which human vision can discern a light source turning on and off, the eye may integrate the total brightness of the pulsing LED to appear as a constant value as if the LED were powered by a DC source. Therefore, for example a 100 Hz, 10% duty-cycle waveform on signal 68 (low for 10% of the time, high for 90% of the time) may cause all illuminated LEDs (those which have had 1's shifted into their bit positions on signal 66) to appear relatively dim (the output enable pin of IC 61 is active low). Furthermore, a 100 HZ, 90% duty-cycle waveform on signal 68 (low for 90% of the time, high for 10% of the time) may cause the illuminated LEDs to appear much brighter, because they are on a longer portion of the time. If it is desired to have the light source 39 project the same amount of light no matter how many LEDs are turned on in a particular animation sequence, the controller 60 may adjust the duty cycle of signal 68 every time it selects a new combination of LEDs to illuminate by clocking in sixteen 1's and 0's on the wire 65, pulsing the latch signal 67 high, and then adjusting the duty cycle of the square wave it supplies on 68.

Resistor 70 may set the output sink current for all 16 of the internal current sinks. For example, for the IC shown, a resistor value of 600 ohms may give an output current per LED of 20 milliamps. Signal 69 nay be the output of the sixteenth shift register stage, and may be used to connect multiple chips of type 61 in order to extend the length of the shift register in multiples of 16 bits.

Microcontroller 60 may supply the intelligence and control signals 65-68 for integrated circuit 61. Microcontroller 60 may be an Atmel AtTiny13. Creating patterns of ones and zeros to clock into integrated circuit 61 at various time may be accomplished by firmware in microcontroller 60, and may be written by anyone reasonable skilled in the art of microcontroller programming.

For a battery application such as a flashlight, battery 63 may power the circuit when switch 41 is turned on. Pushbutton 43 may be interrogated by microcontroller 60 to act as a signal to change the animation sequence from one to another. The firmware in microcontroller 60 may implement any number of animating LED patterns, and mode switch 43 may be used by the operator to cycle between the patterns.

Figure 7:
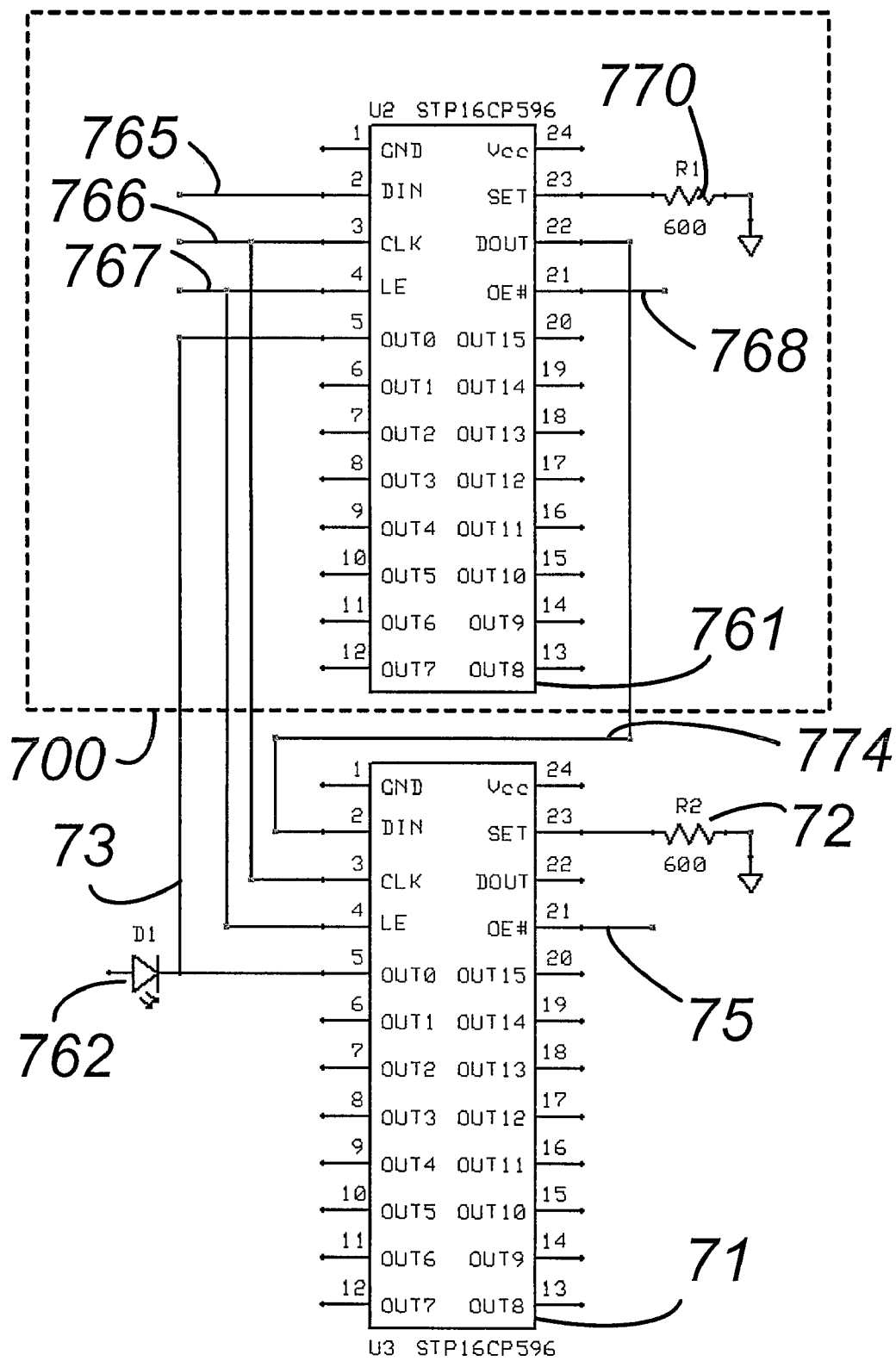
FIG. 7 is a schematic diagram of a circuit to cause one set of LEDs to be linearly dimmed at the same time a second set is linearly increased in intensity, achieving the example effect depicted in FIG. 5

FIG. 7 shows a schematic diagram of a circuit which may add the feature of increasing and decreasing LED intensities in a linear manner as shown with animated light source 59 of FIG. 5. The top portion, enclosed in the dotted rectangle 700, may represent a similar circuit to the one shown in FIG. 6 with integrated circuit 761 in place of integrated circuit 61. Integrated circuit 761 may be of the same type as IC 61. A second integrated circuit 71 of the same type as IC 761 may be added to the circuit and connected as follows. The microcontroller signals 765, 766 and 767 may be wired in parallel, so both IC's 761 and 71 share common signals DIN, CLK and LE.

New signal 774 may connect the DOUT of the first IC 761 to the DIN terminal of the second IC 71, thereby extending the internal shift registers to 32 bits (16 per IC). Therefore to update all 32 outputs (OUT0-OUT15 of IC 761 and OUT0-OUT15 of IC 71) the microcontroller may clock in 32 bits on terminal 765, and then may pulse the LE signal 767. Resistor 72 may set the output sink current value for all outputs OUT0-OUT15 of IC 71, and this resistor may have the same value as resistor 770. Therefore IC 71 may provide the same current drive to its outputs as IC 761.

Signal 75 may be a second output enable signal, which may be a new signal provided by the microcontroller, and which may allow independent duty-cycle waveforms to be supplied to each of the ICS 761 and 71 via signals 768 and 75, respectively. Finally, all of the OUTn signals may be wired together as shown by wire 73 which connects OUT0 of IC 761 to OUT0 of IC71. The remaining OUT pins similarly may also be wired together (not shown). Because the current sinks in IC 761 and IC 71 may be current sinks to ground that can be switched off, the interconnection of the OUTn signals may establish a "wired-OR" logical connection. For example, LED 762 may be driven by either IC 761 or 71, provided that only one current sink is on at once. For example, if the microcontroller shifts a "1" into the bit 0 position of IC 761 and a "0" into the bit position 0 of IC71, then IC 761 may control the intensity of LED 762 since its current sink is turned on and the current sink in IC 71 is turned off. Furthermore, the brightness level of diode 762 (and all other LEDS connected to IC 761 which are switched on) may be controlled by the duty cycle of the signal applied to 768. Correspondingly, the brightness of all LEDs connected to IC 71 and switched on may be controlled by the duty cycle of the microcontroller signal applied to 75. In this manner the intensity values of two groups of LEDs may be independently controlled and therefore the microcontroller may adjust these values to achieve the ramping effect shown in FIG. 5.

Figure 8:
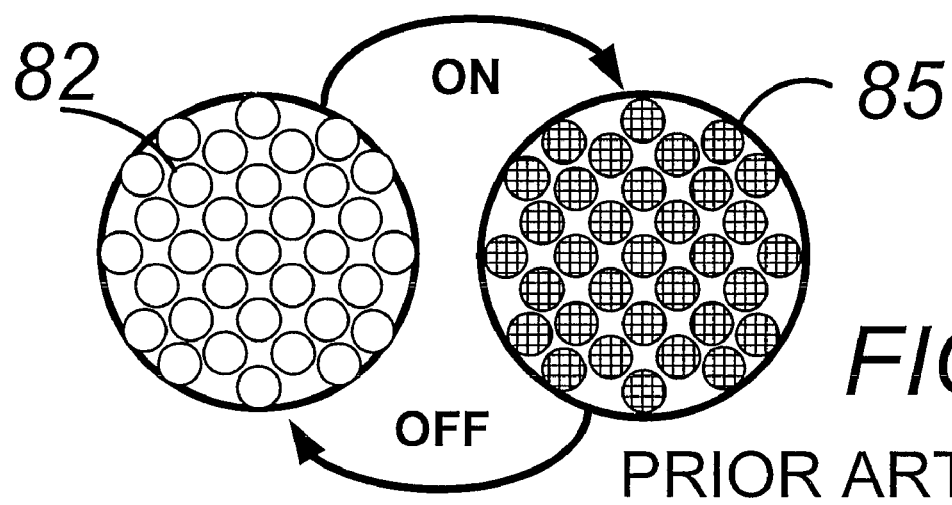
FIG. 8 is a diagrammatic view of two states of an illumination component for a source of illumination such as a flashlight, traffic signal, automobile tail light or other light source turning on and off as constructed according to the prior art.

FIG. 8 shows a diagrammatic view of two states of a conventional illumination component for a source of illumination such as a flashlight, traffic signal, automobile tail light or other light source merely turning all the LEDs from the OFF state 82 to the ON state 85.

Figure 9:
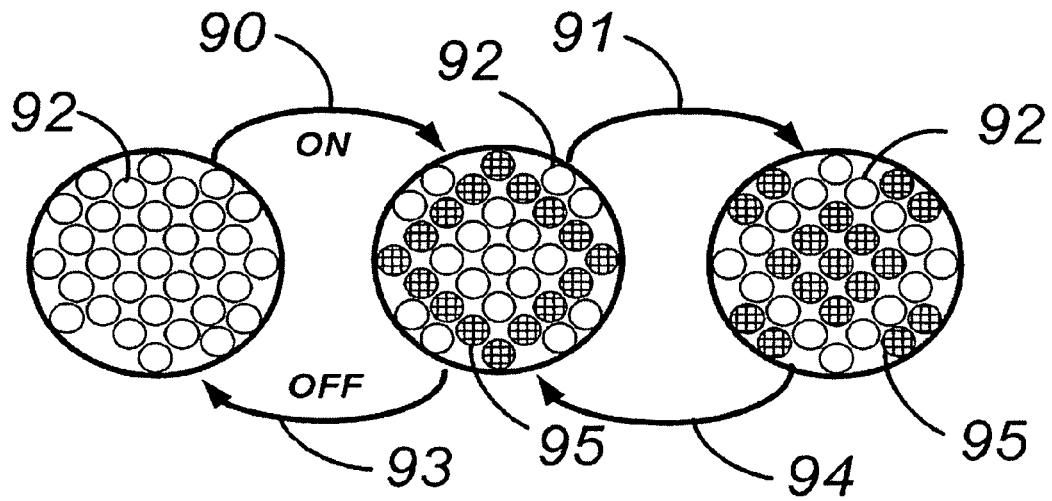
FIG. 9 is a diagrammatic view of three states of an embodiment of the present invention animating a light source similar to the one shown in FIG. 8.

FIG. 9 shows a diagrammatic view of three states of an animated signal light source, generally referenced as 99, according to an embodiment of the invention, the light source 99 being generally similar in construction to the light source 39 except that it may preferably function as a signal light source used in connection with a light source apparatus such as a vehicle, a traffic signal light or other. The three states including off or blinking between two light patterns to achieve a moving and attention-attracting effect by transitioning sets of the LEDs between an OFF state 92 and an ON state 95. The light source 99 may be initially off, and then may be turned on by transition 90, after which it may cycle between two patterns shown by transitions 91 and 94. At any time the display may be turned back to the OFF state, such as transition 93. Thus, the animated light generated by the signal light source is attention attracting.

Figure 10:
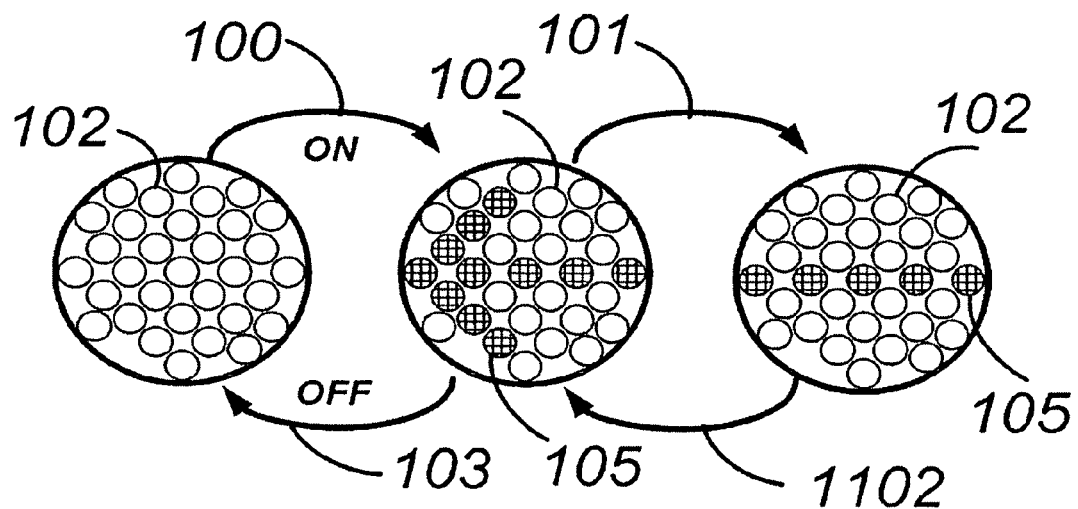
FIG. 10 is diagrammatic view of three states of an embodiment of the present invention in a traffic signal application, in which a left-turn arrow may be first turned on, and then animated by turning the arrow head on off, for the purpose of increasing visibility due to the motion.

FIG. 10 shows a diagrammatic view of three states of another animated signal light source, generally referenced as 109, according to an embodiment of the invention. Light source 109 may expand on the operation of the signal light source assembly used in an apparatus such as a traffic signal or a turn signal indicator concept by presenting a three-state display of off and an animated arrow where the arrowhead blinks between transitions 101 and 1102 by transitioning sets of the LEDs between an OFF state 102 and an ON state 105.

Figure 11:
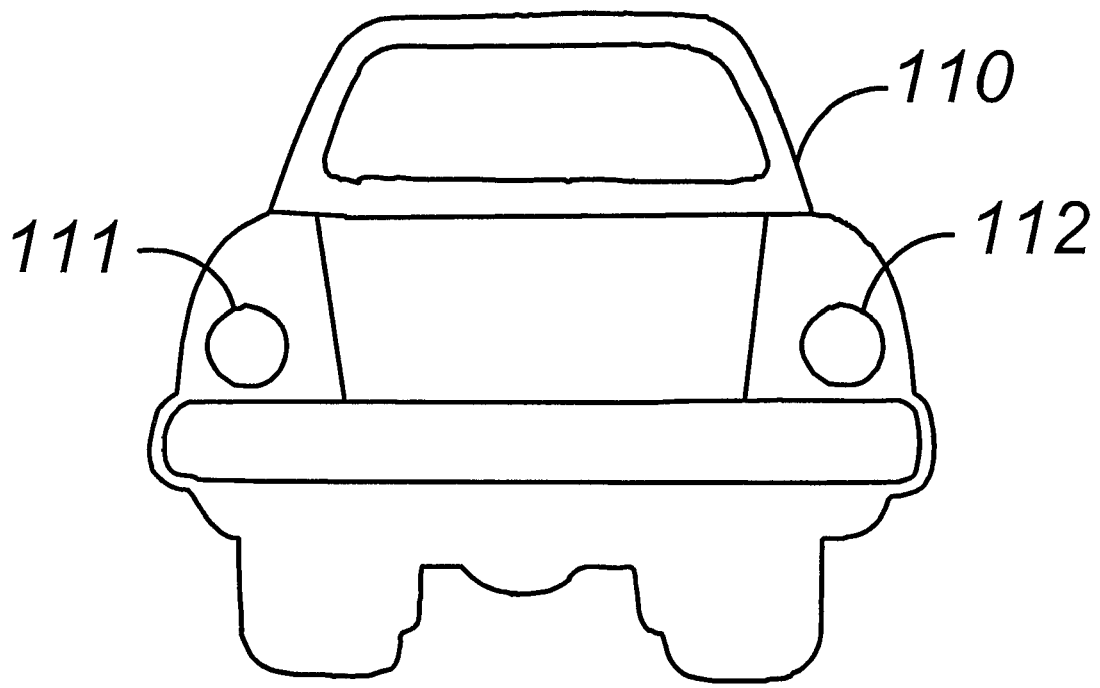
FIG. 11 is a rear view of an automobile using conventional tail lights, constructed either with incandescent lights or arrays of LEDs that are switched on and off according to prior art constructions.
Figure 12:
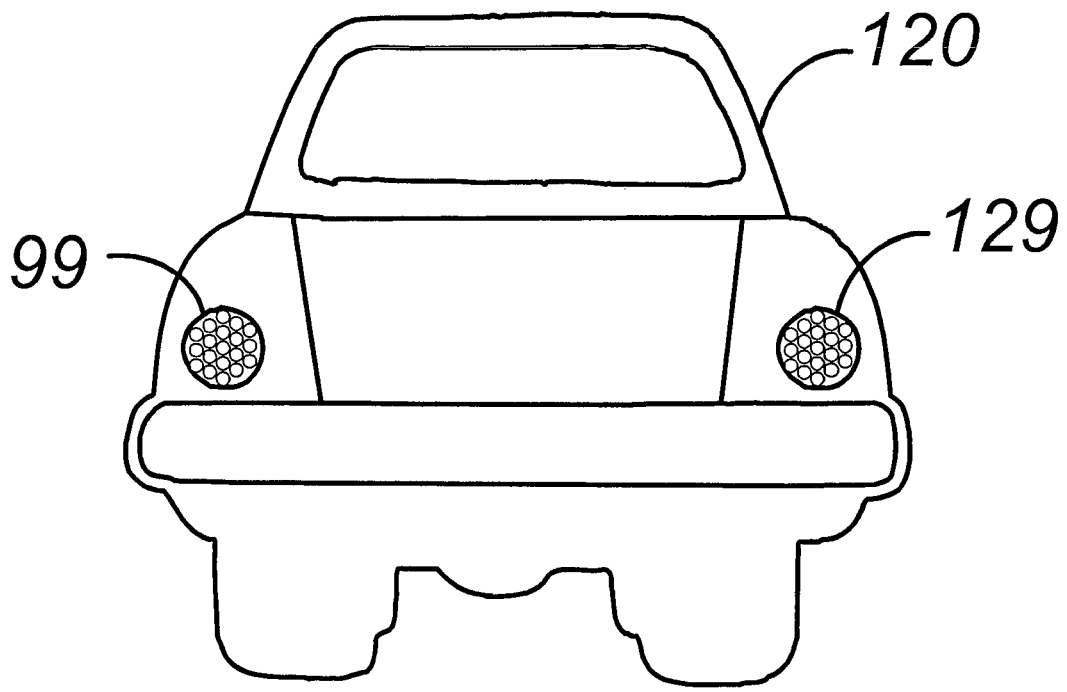
FIG. 12 is a rear view of the automobile which has been fitted (or retrofitted) with a light source according to an embodiment of the invention.

FIGS. 11 and 12 elaborate on the use of the signal light source assembly used on an apparatus such as an automobile tail light. FIG. 11 illustrates the rear view of an automobile 110 with conventional tail lights 111 and 112. These may be incandescent lights or the increasingly common arrays of red LEDs. In either case the tail lights are off when the car operates normally, and on when the driver applies the brakes.

In FIG. 12 the lights 121 and 122 may be replaced by the signal light source assemblies 99 and 129 in an automobile 120. Now when the driver applies the brakes, the tail lights may illuminate, but with an animating pattern, rather than a static display. Introducing motion into the display may make it more visible and attention attracting, and therefore safer under at least some circumstances.

To give two examples of how the animated signal light source may be incorporated into the tail light application, an embodiment serving as a drop-in replacement will be considered, followed by new features of an embodiment of the invention that may be exploited if incorporated into the automobile design.

Embodiments of the invention may be constructed without employing a mode switch 43 in FIG. 6, and may be programmed to present only a single, highly visible, repeating animation sequence as, for example the animation sequence consisting of two patterns as shown in FIG. 9. The embodiment of the invention may now operate with only two wires, power and ground. Since the existing light source in an apparatus such as an automobile or a traffic signal light, may be operated with these same two signals, power and ground, the embodiment may directly replace existing tail lights or traffic signal light components, by packaging the embodiment of the invention in a housing physically compatible with the tail light it replaces as hereinafter described in greater detail. The two-state tail light (OFF and ON) may therefore be replaced by the superior and safer three-state tail light (OFF, BLINK1 and BLINK2) whose sequence is shown in FIG. 9.

If more wires can be attached to the tail light, for example when the car is designed, the changeable nature of the animated light source may be employed to present different animations depending on the intended function. For example, a tail light may represent both a brake light and a turn signal light. If the car electronics can supply not only a power signal and a ground signal, but also a control signal indicating which of the functions is operational, brake or turn signal, the animated light source may display different animations for each desired function. For example the brake light function may use the FIG. 9 patterns as described above, while the turn signal function may be a continuous ON animation. Some designs may already have three signals going to a dual-filament bulb, in which case the "mode" function may be already present. In this case one filament wire may connect to one microcontroller input pin, and the second filament wire may connect to a second microcontroller input pin, and the microcontroller may select between two animations simply by detecting which input pin is activated.

Figure 15:
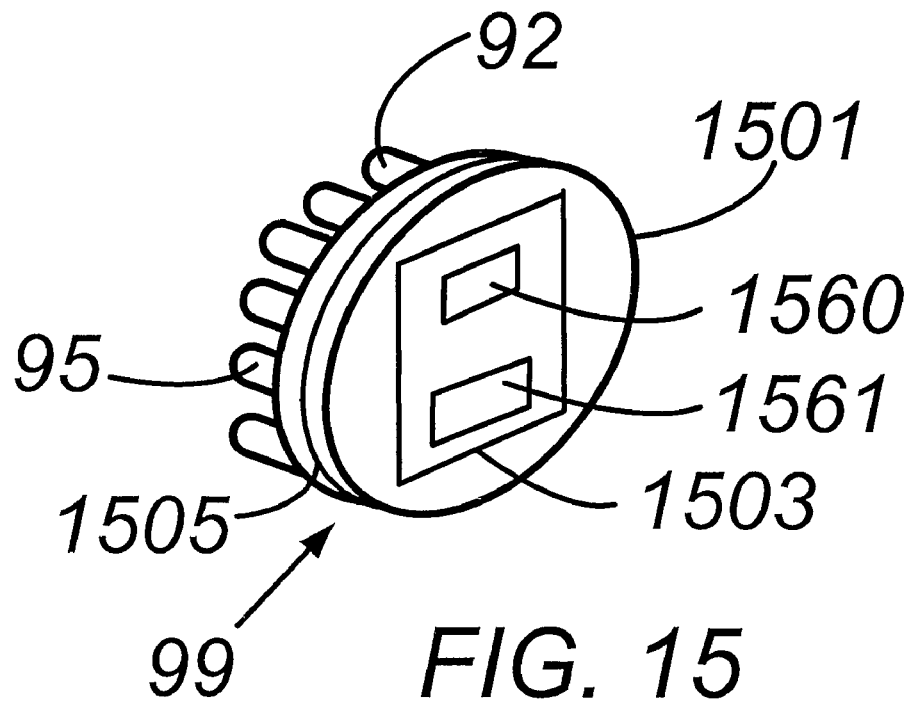
FIG. 15 is a pictorial view of a signal light source assembly, which is constructed according to an embodiment of the present invention.

FIG. 15 shows a pictorial view of the signal light source assembly 99 according to an embodiment of the invention. The signal light source assembly 99 may be utilized in the automobile 120 of FIG. 12 or a traffic signal light 160 of FIG. 16. The signal light source assembly 99 may include a housing 1501 having attached a plurality of LEDs such as LEDs 92 and 95 in the OFF state and the ON state, respectively. A circuit board 1503 having a microcontroller 1560 and integrated circuit 1561, similar to the microcontroller 60 and the IC 61 of FIG. 6, may control the energization of the LEDs and may be included within the housing 1501. A threaded portion 1505 may be included on the housing 1501 to facilitate the installation of the assembly 99 to the automobile 120 or traffic light 160, although it should be understood that other means of attachment may also be employed.

Figure 16:
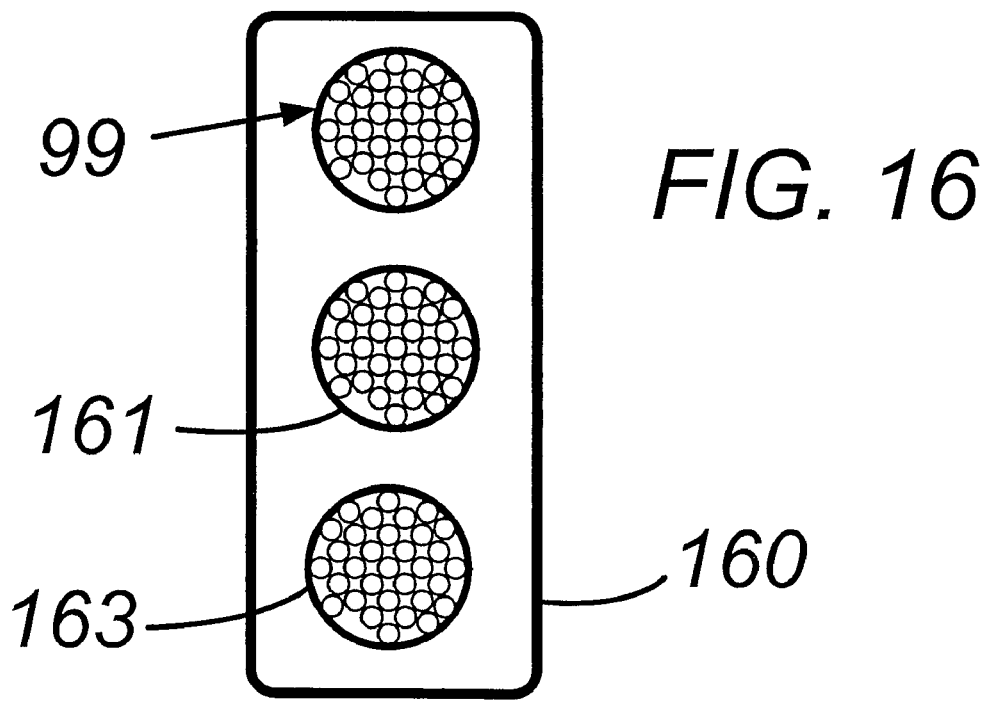
FIG. 16 is a diagrammatic view of a light source apparatus in the form of a traffic signal light employing the signal light source assembly of FIG. 15.

FIG. 16 shows a diagrammatic view of a traffic signal light, generally indicated at 160, utilizing signal light source assemblies constructed according to embodiments of the invention. The traffic signal light 160 may include signal light source assemblies 99, 161, and 163. The signal light source assembly 99 may include red LEDs as would be appropriate for the top red light on the traffic signal light, while signal light source assemblies 161 and 163 may include yellow LEDs and green LEDs, respectively, as would be appropriate for the bottom two lights of the traffic signal light 160. In this manner, the traffic signal light so equipped provides attention attracting signals for the motorists. Also, it should be understood that in place of the signal light source assemblies, signal light sources constructed according to an embodiment of this invention may also be employed as original equipment instead of a retrofit assembly.

Figure 13:
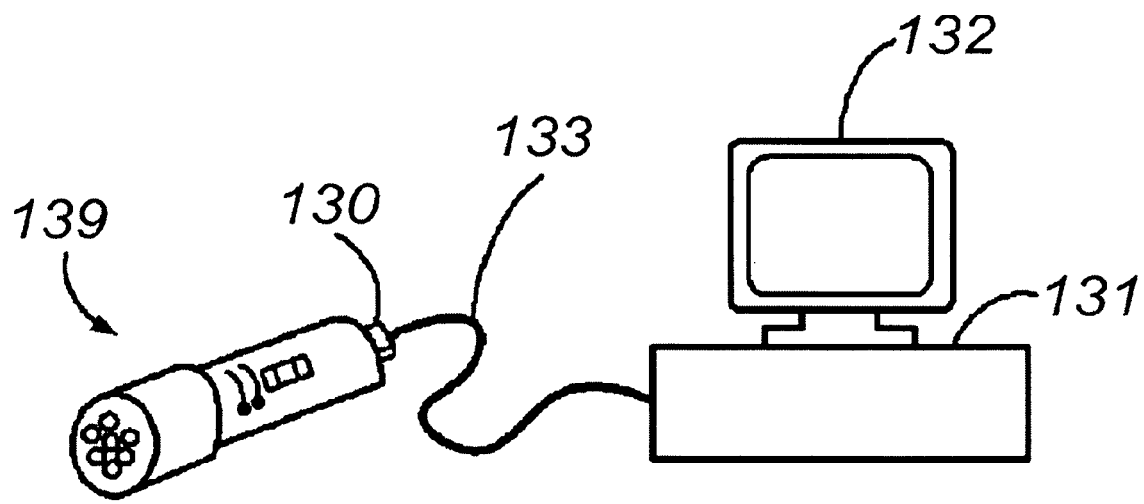
FIG. 13 is a pictorial view of an embodiment of the invention, in which the animated light source may be connected to a personal computer to allow user-customization of the animated light patterns.

FIG. 13 illustrates a pictorial view of a user-programmable animated light source, generally referenced as 139. The animated light source 139, for example packaged as a flashlight, may contain a connector 130 that connects the device to a personal computer 131 using cable 133. The computer user may load an application program that allows the user, via an easy to use graphical interface, to design the individual LED patterns that make animation sequences. The user may design individual patterns by coloring in graphic patterns representative of the LED cluster in the device 139. The user may then group patterns in any number to form an animation, and also specify the time intervals between patterns to form an animation. An on-screen graphic on display 132 may simulate the animation effect, allowing the user to preview and edit the animation sequences. When finished, the program may download the animation sequences into device 139 over cable 133, and the device 139 thereafter may "play" the animation sequences designed by the personal computer user.

If a microcontroller such as the AtTiny13 is used, its internal nonvolatile memory may be employed to store the user-programmed patterns and retain them when the device 139 is switched off. In an embodiment, connector 130 may be a USB (Universal Serial Bus) connector, and the USB functionality may be added to the microcontroller with a simple and easily interfaced USB controller such as the MAXIM MAX3420E.

While particular embodiments of the present invention have been disclosed, it is to be understood that various different modifications and combinations are possible and are contemplated within the true spirit and scope of the disclosed embodiments. There is no intention, therefore, of limitations to the exact disclosure herein presented.

What is claimed is:

1. A light source, comprising:
a light emitting portion for projecting a beam of light to illuminate a surface,
the light emitting portion consisting of a pair of first and second emitter means only,
the first and second emitter means being of the same color,
a control circuit for controlling the selective energization of each one of the first and second emitter means individually to form the beam of light to illuminate the surface,
the first and second emitter means being arranged symmetrically about a center point of the light emitting portion,
the control circuit for selectively energizing the first emitter means continuously alternatingly transitioning between a first intensity level and a second intensity level while the light source is energized without remaining at a constant intensity level,
the control circuit for selectively energizing the second emitter means continuously alternatingly transitioning between the first level and the second level without remaining at a constant intensity level in an inverse manner relative to the transitioning of the first emitter means while the light source is energized so that the first and second emitter means provide substantially constant illumination on the surface for a user, and
the control circuit for selectively energizing the first and second emitter means alternatingly repeatedly continuously in an inversely proportional manner at all times while the light source is energized to provide the appearance of motion of light along the beam to an observer while projecting a substantially constant steady light intensity on the surface to be illuminated.

2. The light source of claim 1, wherein the first and second emitter means are disposed in a circular area having an outer band of emitters and an inner band of emitters.

3. The light source of claim 2, wherein the inner band of emitters are energized together and the outer band of emitters are energized together.

4. The light source of claim 1, wherein the control circuit repeatedly switches the emitter means between off and substantially full on to provide the appearance of motion of light within the beam.

5. The light source of claim 1, wherein the control circuit repeatedly transitions the emitter means between off and substantially full on using at least one intermediate intensity level to provide the appearance of motion of light within the beam.

6. The light source of claim 1, wherein the first and second emitter means are alternately and repeatedly transitioned between off and on to provide the appearance of motion of light within the beam.

7. The light source of claim 1, wherein the control circuit includes a microcontroller and at least one 16-bit shift register.

8. The light source of claim 7, wherein the microcontroller includes animation information regarding individual emitter patterns, the number of patterns sequenced to make an animation, the timing between patterns, and the number of selectable animations.

9. The light source of claim 8, further including a USB connector in communication with the microcontroller for permitting the user to program the animation information.

10. The light source of claim 1, wherein the control circuit is adapted to illuminate the emitter means in a plurality of animations, each animation comprising a collection of light patterns that automatically sequence from one to the next in a repeating fashion.

11. The light source of claim 10, further including a switch for selecting one of the plurality of animations.

12. The light source of claim 10, wherein the plurality of animations are fixedly stored in the control circuit.

13. The light source of claim 10, wherein the patterns switch on and off to achieve a blinking animation effect.

14. The light source of claim 10, wherein the patterns sequence in a linear manner in which a first set of emitters decreases in intensity as a second set of emitters increases in intensity producing a smooth ramping transitional effect.

15. The light source of claim 14, wherein the light intensity of the increasing set of emitters is inversely proportional to the light intensity of the decreasing set of emitters.

16. The light source of claim 1, wherein the light source is a flashlight.

17. The light source of claim 1, wherein the light source is a traffic light.

18. The light source of claim 17, wherein the light source is adapted to replace a conventional light source in an existing vehicle without additional modifications to the vehicle.

19. The light source of claim 1, wherein the light source is a vehicle light.

20. A method of controlling a plurality of similarly colored solid-state emitters, comprising:
- arranging the plurality of emitters into a light emitting portion consisting of a pair of first and second emitter means only;
- arranging symmetrically the first and second emitter means about a center point of the light emitting portion;
- controlling the energization of the first emitter means to continuously alternatingly transition between a first intensity level and a second intensity level without remaining at a constant intensity level;
- controlling the energization of the second emitter to continuously alternatingly transition between the first level and the second level without remaining at a constant intensity level in an inverse manner relative to the transitioning of the first emitter means to provide substantially constant illumination on the surface to a user, and
- continuously repeatedly alternatingly energizing the first and second emitter means in an inversely proportional manner at all times to provide the appearance of motion of light within the beam to an observer while projecting a substantially constant steady light intensity on the surface to be illuminated.

21. The method of claim 20, wherein the controlling the energization includes repeatedly switching the emitters between off and substantially full on.

22. The method of claim 20, wherein the controlling the energization includes repeatedly transitioning the emitters between off and substantially full on using at least one intermediate intensity level.

23. A light source, comprising:
- a light emitting portion for projecting a beam of light to illuminate a surface;
- the light emitting portion consisting of a pair of first and second emitter means only;
- the first and second emitter means being of the same color;
- the first and second area emitter means being arranged symmetrically about a center point of the light emitting portion;
- means for controlling the energization of the first emitter means to continuously alternatingly transition between a first intensity level and a second intensity level without remaining at a constant intensity level;
- means for controlling the energization of the second emitter to continuously alternatingly transition between the first level and the second level without remaining at a constant intensity level in an inverse manner relative to the energization of the first emitter means to provide substantially constant steady illumination on the surface to a user, and
- the means of continuously repeatedly alternatingly energizing the first and second emitter means in an inversely proportional manner at all times to provide the appearance of motion of light within the beam to an observer while projecting a substantially constant steady light intensity on the surface to be illuminated.

* * * * *